(12) United States Patent
Hoock

(10) Patent No.: US 9,382,105 B2
(45) Date of Patent: Jul. 5, 2016

(54) FORK LIFT TRUCK WITH STEERING MEANS

(71) Applicant: NACCO Materials Handling Group, Inc., Fairview, OR (US)

(72) Inventor: Michael Hoock, Lonato (IT)

(73) Assignee: Hyster-Yale Group, Inc., Fairview, OR (US)

( * ) Notice: Subject to any disclaimer, the term of this patent is extended or adjusted under 35 U.S.C. 154(b) by 0 days.

(21) Appl. No.: 14/502,396

(22) Filed: Sep. 30, 2014

(65) Prior Publication Data

US 2015/0096405 A1 Apr. 9, 2015

(30) Foreign Application Priority Data

Oct. 7, 2013 (EP) .................................... 13187600

(51) Int. Cl.
| | | |
|---|---|---|
| *B62D 1/183* | (2006.01) | |
| *B66F 9/075* | (2006.01) | |
| *B62D 1/18* | (2006.01) | |
| *B62D 1/185* | (2006.01) | |

(52) U.S. Cl.
CPC .............. *B66F 9/07568* (2013.01); *B62D 1/18* (2013.01); *B62D 1/183* (2013.01); *B62D 1/185* (2013.01); *B66F 9/0759* (2013.01)

(58) Field of Classification Search
CPC .... B66F 9/07568; B62D 1/183; B62D 1/185; B62D 1/187
See application file for complete search history.

(56) References Cited

U.S. PATENT DOCUMENTS

| | | | | | |
|---|---|---|---|---|---|
| 3,491,663 | A | * | 1/1970 | Morgan | B62D 1/184 74/493 |
| 3,791,223 | A | * | 2/1974 | Treichel | B62D 1/184 74/493 |
| 4,418,582 | A | * | 12/1983 | Martin | B62D 1/184 403/374.4 |
| 4,541,299 | A | * | 9/1985 | Kanaya | B62D 1/184 280/775 |
| 6,223,620 | B1 | | 5/2001 | Jolley | |

FOREIGN PATENT DOCUMENTS

| | | |
|---|---|---|
| DE | 1904900 U | 11/1964 |
| DE | 1207219 B | 12/1965 |
| EP | 0481432 A1 | 4/1992 |
| EP | 0995663 A2 | 4/2000 |

OTHER PUBLICATIONS

European Search Report for EP13187600.5-1755, Mar. 19, 2014.

* cited by examiner

*Primary Examiner* — Ruth Ilan

(57) ABSTRACT

Fork lift truck 10, comprising a steering means 20, the steering means 20 comprising a steering column 30 which is adjustable by extending and retracting along an adjustment axis 21, a steering wheel 40 that is arranged on the steering column 30, a locking means 50 for locking the steering column 30 at a position along the adjustment axis of the steering column 30 and for releasing the steering column 30 for adjustment, a release button 60 that is connected to the locking means 50 and is adapted to control the locking means 50, wherein upon pushing of the release button 60, the release button 60 releases the locking means 50 thereby enabling the adjustment of the steering column 30, and wherein, simultaneously by one hand, said release button 60 can be actuated and the steering column 30 adjustment can be performed.

20 Claims, 5 Drawing Sheets

FORK LIFT TRUCK WITH STEERING MEANS

1. FIELD OF THE INVENTION

Figure 1:
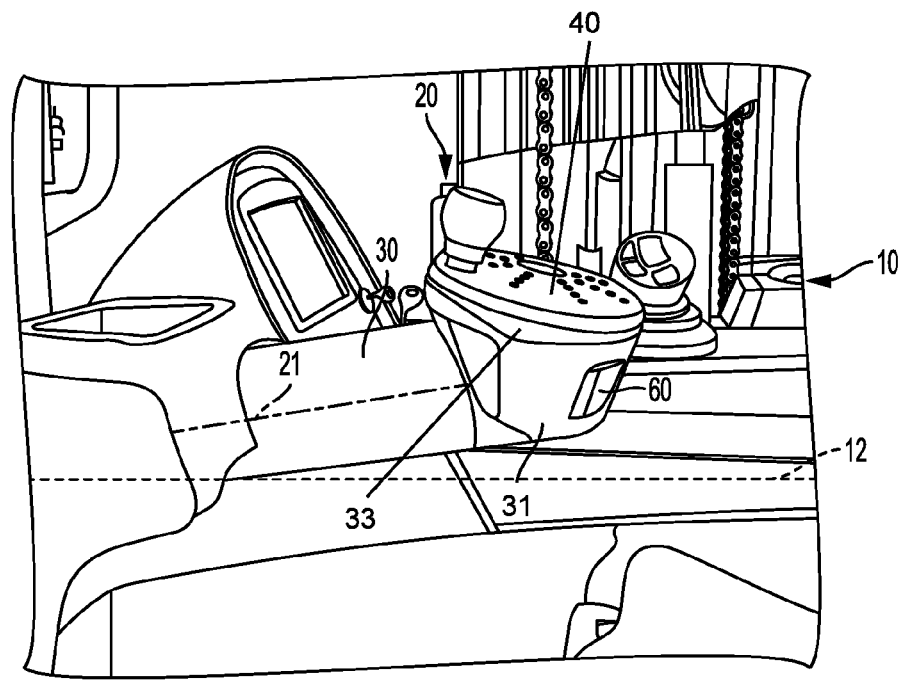

The present invention relates to a fork lift truck comprising steering means that can be locked in different latch positions and can be released and adjusted simultaneously by one hand.

2. TECHNICAL BACKGROUND

In the field of manufacturing and warehousing operations, fork lift trucks, in particular reach trucks are used to lift and transport materials. Due to the requirement in the field of manufacturing and warehouse operations that an operator driving a fork lift truck has to transport materials and to subsequently handle them, it is important that the operator can get on and get off the fork lift truck easily and fast.

It is known in the art to provide an adjustable steering column of a fork lift truck, which for example allows for an adjustment in horizontal and vertical direction of the steering wheel, thereby adjusting the control elements of the fork lift truck to anthropometric measurements.

A typical example of a fork lift truck comprising a steering column and a steering wheel is described in EP 0 995 663 A2. This document discloses a steering column that is attached to the cabin of the fork lift truck and which can be pivoted around the horizontal transverse axis. The steering wheel can be adjusted in height by means of a moveable fastening device, which allows that an angle of the steering wheel does not change in relation to the horizontal axis. Furthermore, the construction comprises a locking device that locks the steering wheel and steering column in position by a pin and different holes in the locking device.

However, with these prior art constructions, it is unduly burdensome for the operator to get on or get off the fork lift truck, because the steering column and steering wheel have to be passed by the operator. Thus the steering wheel is an obstacle for the operator. Furthermore, the adjustment of the steering wheel and steering column usually requires a two hand operation, because the operator has to manually find a release lever on the steering column and then has to move the steering wheel to a desired adjustment position. Afterwards, the release lever has to be moved to the locked position to secure the new steering wheel adjustment position.

In the field of forklift trucks, particular reach trucks, it is common that the steering wheel is arranged to be operated by the left hand of the operator. In such case the operator has to pass the steering column and the steering wheel to get on and off the fork lift truck.

In one embodiment of the present invention a fork lift truck is provided comprising a steering means, which comprises a steering column which can be adjusted easily and fast and in one working step, facilitating for the operator to get on or off the fork lift truck.

3. SUMMARY OF THE INVENTION

In an embodiment of the present invention, a fork lift truck, comprising a steering means is provided, wherein the steering means comprises a steering column, which is adjustable by extending and retracting along an adjustment axis, a steering wheel that is arranged on the steering column, a locking means for locking the steering column at a position along the adjustment axis of the steering column and releasing the steering column for adjustment, a release button that is connected to the locking means and is adapted to control the locking means, wherein upon pushing of the release button, the release button releases the locking means thereby enabling the adjustment of the steering column, and wherein, simultaneously by one hand, said release button can be actuated and the steering column adjustment can be performed.

Preferably, the steering column can be adjusted by pushing and thereby retracting the steering column in a retraction direction, thereby allowing an operator to get on or off the fork lift truck more easily. The steering column can further be adjusted by extending the steering column, by pulling it towards the operator in an extension direction. Thereby the steering means is adjusted for steering and driving after the operator got on the fork lift truck. The locking means allows for locking the steering column at different latch positions, thereby preventing the steering column from being moved into any direction, and allows for releasing the steering column, when the operator wants to adjust the steering column. The release button has the advantage that the steering column can be locked or released in an easy way. A release button releases the locking means m upon pushing of the release button, thereby enabling the adjustment of the steering column.

Furthermore, the release button can be actuated and the steering column adjustment can be performed simultaneously by one hand. Preferably, the pushing of the release button and the retraction or extension of the steering column can be made in one motion sequence by the operator single handed. The operator can push the release button essentially simultaneously as he adjusts the steering column. This has the advantage that the operator is not burdened by multiple operation steps or motion sequences. Instead the operator can easily and quickly release the locking means and adjust the steering column in one movement at a desired position along the adjustment axis. This makes steering column extension and retraction fast and easy, what is particularly advantageous, because in the field of fork lift trucks it is likely that the operator gets on and off the fork lift truck frequently. Steering column retraction minimizes the space required for the steering wheel and thus facilitates getting on and off the fork lift truck.

Preferably, the pushing of the release button can be performed essentially parallel to the adjustment axis. This further improves the user friendly and ergonomic functionality of pushing the release button and adjusting the steering column in the same direction. Thus releasing the locking of the steering column and steering column adjustment can be done by one movement of the operator.

Preferably, the release button can be pushed in the retraction direction of the steering column. A release button being pushed in the retraction direction has the advantage that the functionality of releasing the locking means together with adjusting the steering column can be made by the operator in on single movement direction. The operator simply pushes the steering column away, by pushing the release button. Thereby simultaneously the locking means is released and the steering column is retracted. This can easily be done with the palm of an operator's hand.

In an alternative embodiment the release button is being pushed in the extension direction. This means that, when the operator pulls the steering column towards himself, i.e. in the extension direction, the release button can be pushed for example by using the operator's fingers, thereby enabling a smooth and easy movement that allows to release the locking means together with adjusting the steering column in one easy and fast movement.

Preferably, the steering column is adjustable in different latch positions. This has the advantage that the operator can choose from different positions and that the operator can select the most comfortable latch position that corresponds to the length of the steering column being retracted or extended. Moreover, this has the advantage that a firm and solid arrangement is provided avoiding any play in the steering column. Preferably, the latch positions are spaced apart in one millimeter steps.

Preferably, when not actuated, the release button is adapted to control the locking means such that the steering column is held in the locked position. By such an arrangement it is advantageously possible to maintain a firm and solid locking of the steering column by simply releasing the release button.

Preferably, the steering wheel comprises an electrical rotary encoder. Such an electrical rotary encoder advantageously provides a highly accurate determination of the position of the steering wheel thereby enabling accurate steering of the fork lift truck. An electrical rotary encoder further has the advantage that only electrical lines have to be guided through the length adjustable steering column, what is much easier than guiding mechanical steering components or hydraulic lines.

Preferably, the release button is spring-biased. Thereby the release button and the preferably the locking means connected thereto returns automatically the locked position.

Preferably, the steering column comprises a linear ball bearing mount. For example, four linear ball bearings can be provided on the steering column. The m ball bearing mount can be provided in the arrangement so as to allow a smooth, linear and firm movement of the guide rail. This has the advantage that the steering column can be accurately and solidly adjusted without any play in the movement.

Preferably, the steering column is adapted to withstand an application of a force of up to 1000 Newton. The design and material of the steering column is provided to be significantly robust such that it can withstand forces that occur during heavy use. This is, for example, sufficient to hold a single person's weight. Moreover, this construction has the advantage of a robust feeling and reliable handling during the steering operation and adjustment.

Preferably, the release button is arranged such that it is adapted to be actuated by the palm of the hand of an operator. This is particularly advantageous, when the operator pushes the release button in the retraction direction, thereby releasing the locking means and enabling the adjustment of the steering column in one movement.

Preferably, the release button is arranged such that it is adapted to be actuated by one or more fingers of an operator. This particular arrangement is advantageous, when the operator pushes the release button in one smooth and easy movement, and when the operator pulls the steering column and steering wheel towards himself, i.e. in the extension direction.

Preferably, the steering column is inclined relative to the horizontal axis of the fork lift truck. In an embodiment the steering column is inclined by an angle of 1° to 20° relative to the horizontal axis of the fork lift truck, more preferably by an angle of 10° relative to the horizontal axis of the fork lift truck. Such an arrangement is advantageous, because the steering wheel is better suitable for operators of different size for a comfortable operating position.

Preferably, the release button that is mechanically connected to the locking means and is adapted to mechanically control the locking means. Such a mechanical connection is very reliable, robust and needs no external power. In other embodiments the release button can be electrically, hydraulically or pneumatically connected to the locking means for controlling the locking means. Such solutions may provide more design flexibility.

Preferably the fork lift truck further comprises a guide rail that linearly supports the steering column, wherein the guide rail is rigidly mounted to the frame of the fork lift truck. Thus, the steering column is linearly displaceable but cannot rotate with respect to the frame of the fork lift truck.

A further embodiment of the present invention relates to a method for adjusting a steering means of a fork lift truck, the steering means comprising a steering column which is adjustable by extending and retracting along an adjustment axis, a steering wheel that is arranged on the steering column, a locking means for locking the steering column at a desired position along the adjustment axis of the steering column and for releasing the steering column for adjustment, and a release button that is connected to the locking means and is adapted to control the locking means, wherein the method comprises the steps of a) pushing the release button, wherein the release button releases the locking means thereby enabling the adjustment of the steering column, and b) actuating the steering column for adjusting the steering column, wherein both steps are performed simultaneously by one hand.

This method makes steering column extension and retraction fast and easy, what is particularly advantageous in the field of fork lift trucks for an operator who needs to gets on and off the fork lift truck frequently. Steering column retraction minimizes the space required for the steering wheel and thus facilitates getting on and off the fork lift truck.

5. BRIEF DESCRIPTION OF THE DRAWINGS

Figure 2:
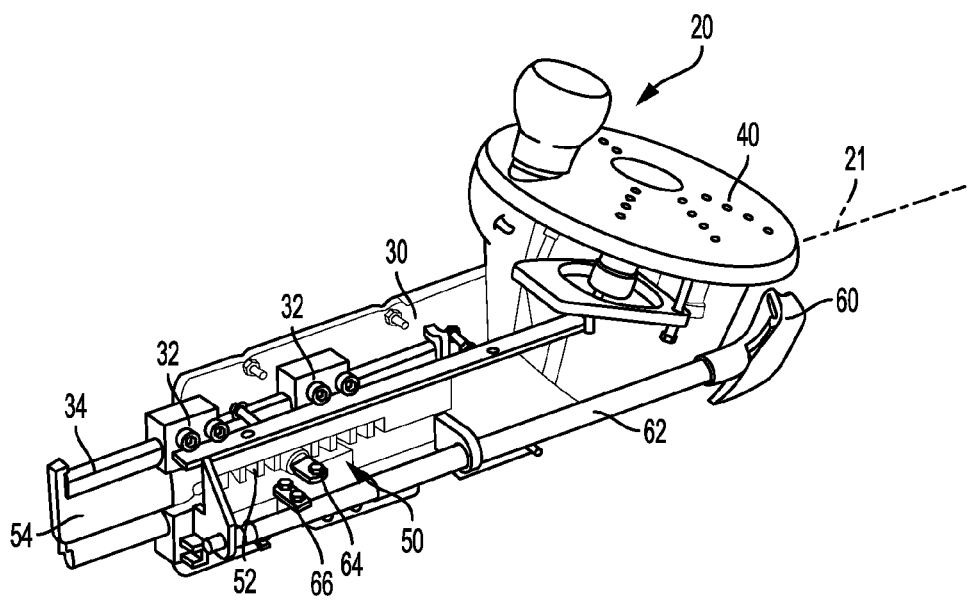
Figure 3:
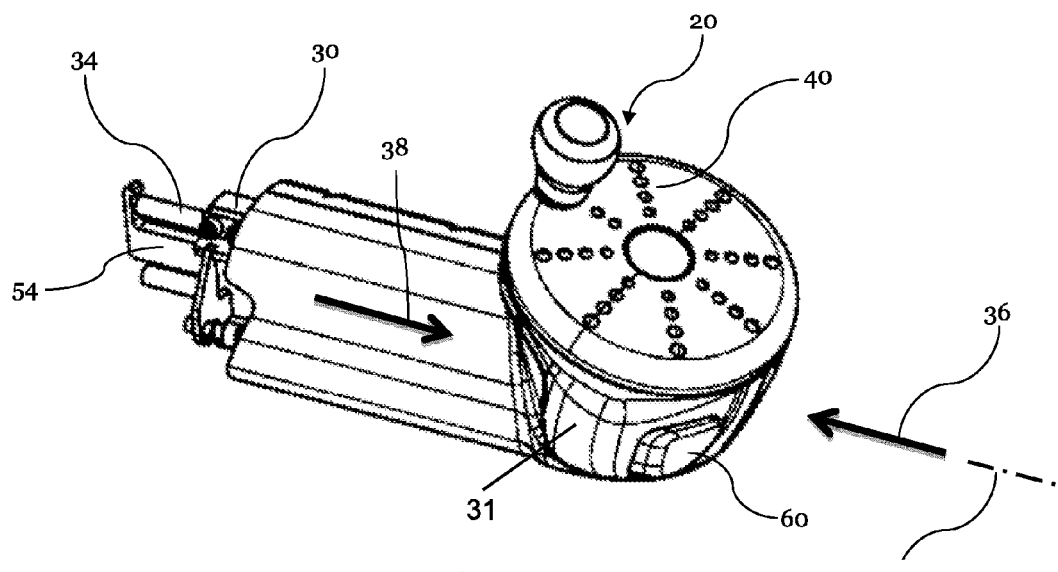
Figure 8:
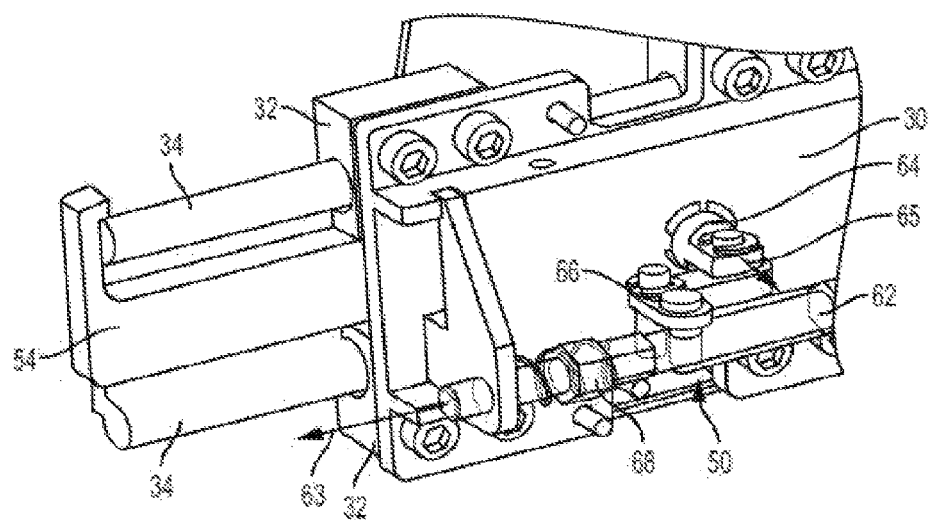
Figure 9:
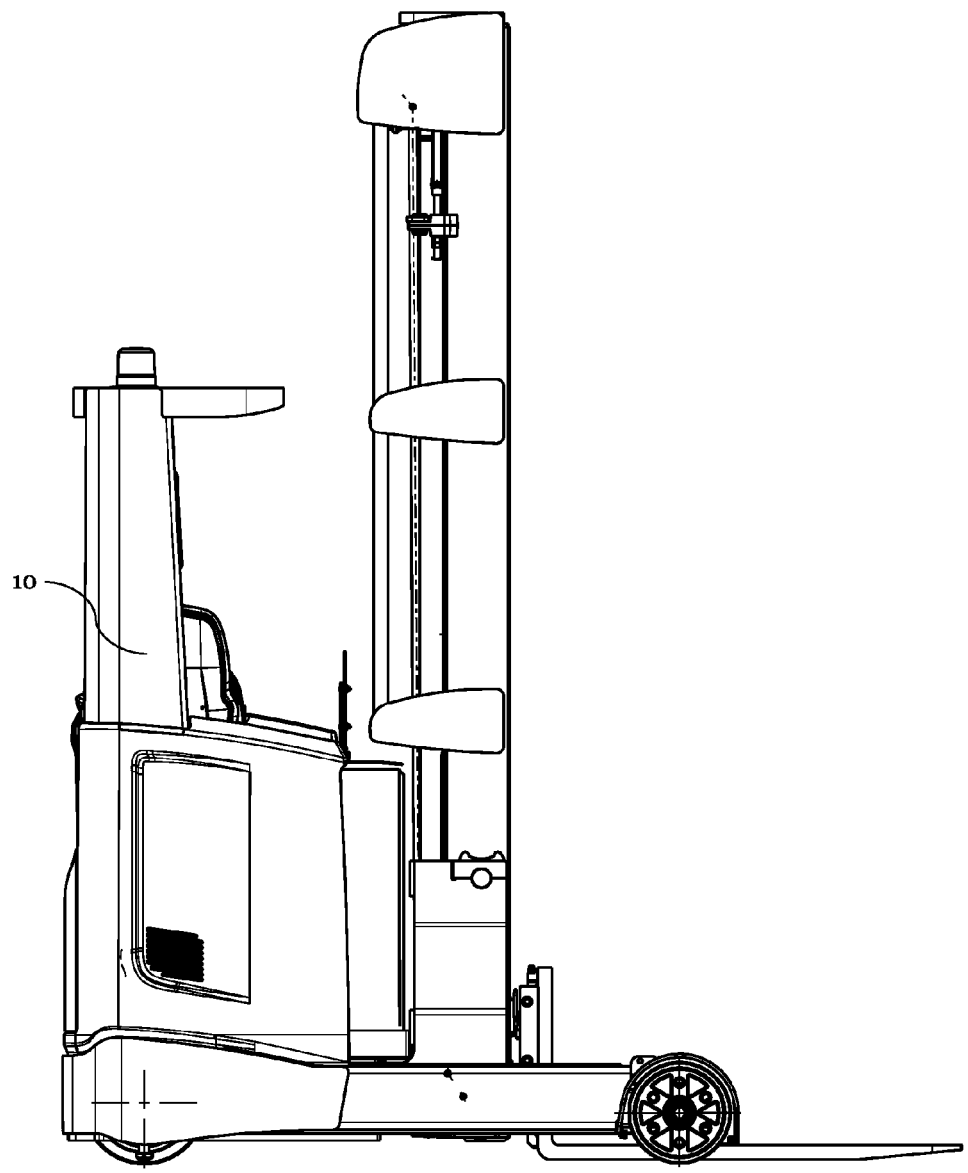

In the following, preferred embodiments of the invention are disclosed by reference to the accompanying figures, in which shows:

FIG. 1 a detailed view of a preferred embodiment of a fork lift truck, comprising steering means;

FIG. 2 a preferred embodiment of the steering means in a three-dimensional schematic view, wherein a front housing part is removed to see the interior elements of the steering means;

FIG. 3 a preferred embodiment of the steering means in a three-dimensional schematic view with housing parts;

FIGS. 4-7 a preferred embodiment of the steering means in three-dimensional schematic views from different angles;

FIG. 8 a three dimensional schematic view of a detail of the preferred embodiment of the steering means of FIGS. 3-7; and FIG. 9 a schematic view of an exemplary embodiment of a fork lift truck.

6. PREFERRED EMBODIMENTS OF THE INVENTION

In the following preferred embodiments of the invention are described in detail with respect to the figures.

FIG. 1 shows parts of the operator cabin of a fork lift truck 10 that is exemplarily shown in FIG. 9. The operator cabin comprises a steering means 20 that is attached in front of a sitting operator (not shown) and at the left part of the operator cabin for an actuation by the left hand of the operator.

The steering means 20 comprises a length adjustable steering column 30 at which a steering device, such as steering wheel 40, is mounted. Steering wheel 40 is preferably mounted on a steering device portion 33 of the steering column 30. The steering wheel 40 is preferably connected to an electrical rotary encoder that transmits the angular position of the steering wheel 40 into electronic steering signals by which a steered wheel (not shown) of the fork lift truck is controlled.

As can be seen from FIG. 1 the steering column 30 is inclined relative to the horizontal axis 12 of the fork lift truck 10 for example by an angle of about ten degrees relative to the horizontal axis 12 of the fork lift truck 10. This arrangement is advantageously suitable for an operator to operate the steering wheel, because the inclination allows an ergonomic adjustment of the steering wheel 40 to operators of different sizes. In other embodiments, the angle of the steering column 30 may be in a range of about one degree relative to the horizontal axis 12 of the fork lift truck 10 to about 20 degrees relative to the horizontal axis 12 of the fork lift truck 10.

In FIG. 1 the steering column 30 is shown in a fully extended position. It can be retracted or adjusted along an adjustment axis 21 by pushing the release button 60 and by simultaneously moving the steering column in a retraction direction 36.

FIG. 2 shows a three-dimensional side view of the steering means 20, comprising the steering column 30, the steering wheel 40, a locking means 50 and a release button 60, that is mechanically connected to the locking means 50.

Moreover, the steering column 30 comprises linear ball bearings 32 which enclose parts of a guide rail 34 in order to linearly support the steering column 30 on the guide rail 34. Thereby, the guide rail 34 provides a firm and solid support of the steering column 30. A locking bard 54 is enclosed by the guide rail 34 for locking and releasing the relative positioning of guide rail and steering column 30 to each other. The guide rail 34 and the locking bar 54 are rigidly mounted to the frame of the fork lift truck 10. Thereby, the steering means 20 is mounted to the fork lift truck 10. In other embodiments the angle of inclination of the steering column 30 may be adjustable by an operator. To this end the guide rail 34 and the locking bar 54 are adjustably mounted to the frame of the fork lift truck 10 so that the angle of inclination of the steering column 30 can be adjusted.

The locking bar 54 has a plurality of notches 52 which define possible latch positions. The locking is done by means of a pin 64 that enters one of the notches 52 and blocks the movement of the steering column 30 with respect to the locking bar 54. The pin 64 is connected to a corresponding hinge mechanism 66, which is in turn connected to a push rod 62 of the release button 60. By pushing the release button 60, the push rod 62 is moved in the retraction direction 36, thereby engaging the hinge mechanism 66, which in turn moves the pin 64 out of one of the notches 52. Details of the hinge mechanism 66 can best be seen in FIGS. 6 and 8.

FIG. 1 and FIG. 3 show a release button 60 arranged on a grip portion 31 of the steering column 30 facing an operator. However, it is to be noted that the release button 60 can also be arranged on another part of the grip portion 31, in particular on a part of the grip portion 31 facing away from the operator. In such a case the release button 60 is adapted to be actuated by one or more fingers of the operator.

FIG. 3 shows a three-dimensional schematic view of the steering means 20, with the steering column 30, the steering wheel 40 and the release button 60 facing to the operator. The arrow 36 illustrates the direction of the retracting adjustment and the arrow 38 illustrates the direction of the extension adjustment. As can be seen from FIG. 3 the steering column 30 can be released by pushing the release button 60 in the direction of the retraction adjustment 36 and simultaneously by applying a force in the direction of the retraction adjustment 36. The retraction direction 38 and the extension direction 36 are parallel to the adjustment axis 21 of the steering column 30.

When the operator is sitting in the fork lift truck 10, having the steering column 30 in the retracted position, the operator can easily and quickly push the release button 60 and pull the steering column 30 in the extension direction 38, i.e. pulling the steering column 30 towards himself. Likewise, when the operator wants to get off the fork lift truck 10, he can easily push the release button 60—for example with the palm of his left hand—and then simultaneously push the steering column 30 in the retraction direction 36, in order to retract the steering means 20 in retraction direction 36. Preferably the pushing direction of the release button 60 is parallel to the adjustment axis 21 of the steering column 30.

Figure 4:
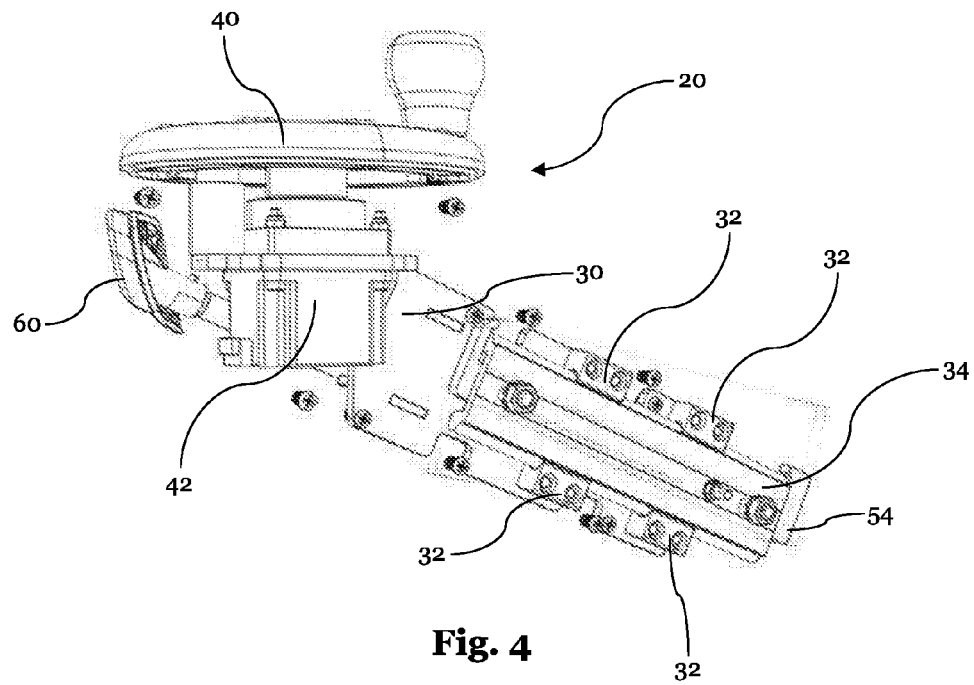

FIGS. 4-7 further show construction details of the steering means 20. FIG. 4 shows details of the guide rail 34 enclosing and interacting with the locking bar 54, in order to provide for a firm and solid locking of the steering means 20. Four linear ball bearings 32 linearly support the steering column 30 at the guide rail 34.

Furthermore, FIG. 4 shows that the steering wheel 40 is connected to an electrical rotary encoder 42 for translating the rotational movement of the steering wheel 40 into electrical signals, thereby providing an accurate steering functionality of the steering means 20.

Figure 5:
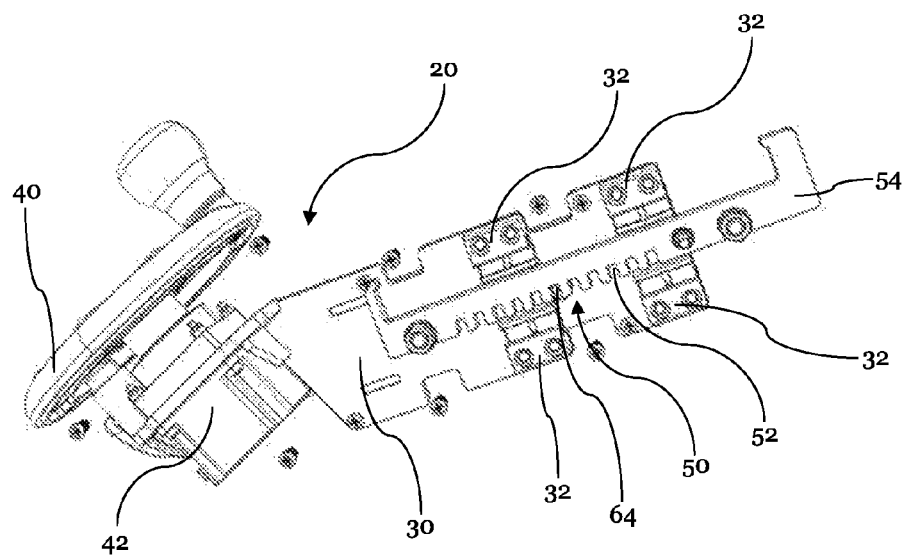

FIG. 5 shows a three-dimensional side view of the steering means 20 with the guide rail 34 removed for better showing the locking bar 54 and the pin 64 engaging one of the notches 52. The notches 52 are, for example, spaced apart in 1 mm steps to enable a fine length adjustment of the steering column 30.

Figure 6:
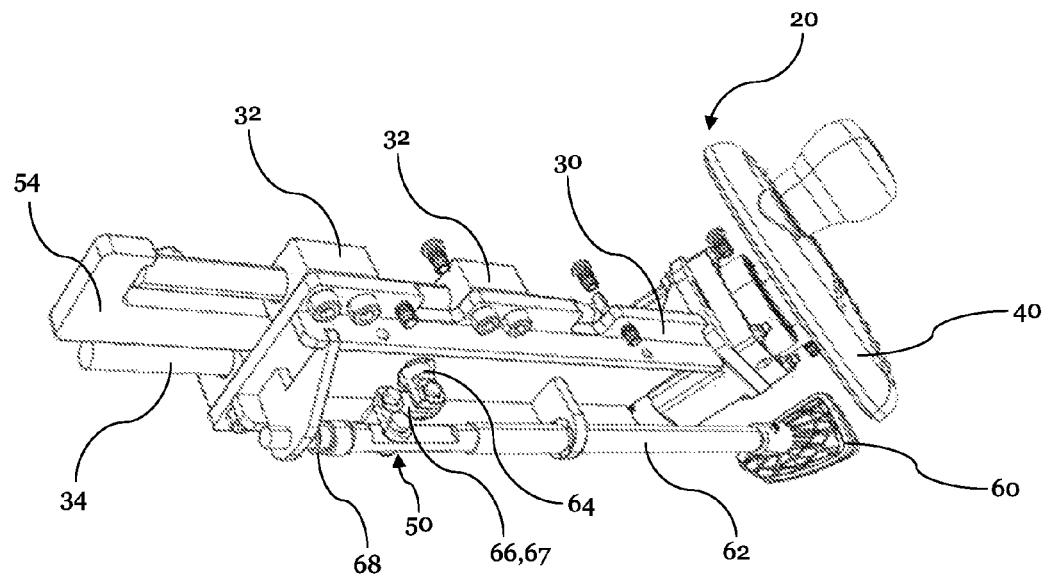
Figure 7:
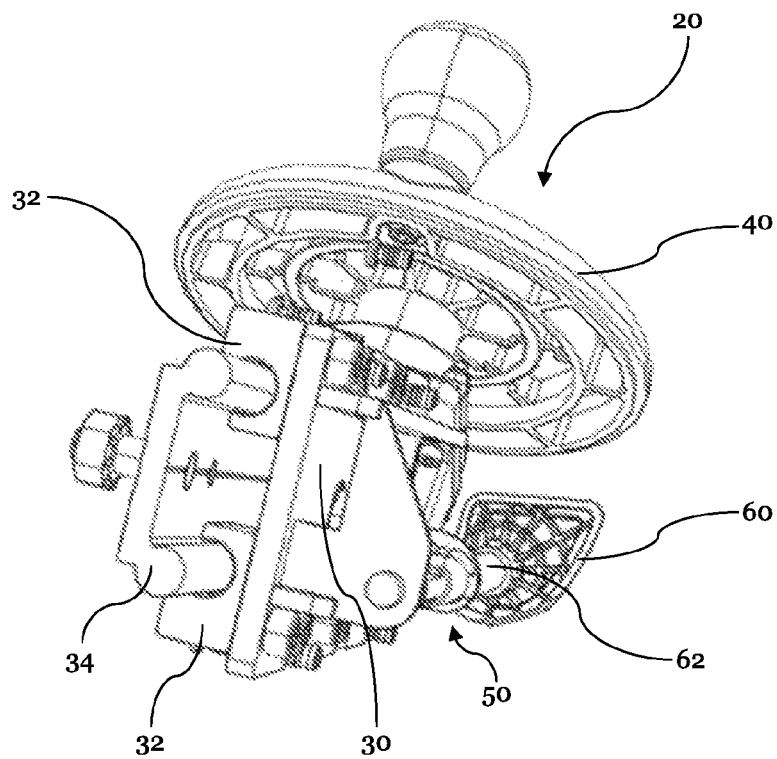

FIG. 6 shows a three-dimensional side cut view of the steering means 20 for illustrating the locking means 50 and the release button 60. Details of the locking mechanism can also be seen best in FIG. 8. The release button 60 is mechanically connected to a push rod 62 that is displaceable supported at the steering column 30. By pushing the release button 60 the push rod 62 is displaced—in FIG. 6 to the left—against the biasing force of a spring 68. If the release button 60 is released then the biasing force of spring 68 moves push rod 62 back to the initial position—in FIG. 6 to the right.

The push rod 62 is mechanically connected to a hinge mechanism 66, which translates the movement of the push rod 62 by 90 degrees in order to move the pin 64 back and forth in transverse direction. To this end the hinge mechanism 66 comprises a lever that is rotatably supported at the steering column 30 and rotatably connected to both the push rod 62 and the pin 64. By displacing the push rod 62—in FIG. 6 to the left—the lever 67 is rotated in clockwise direction and the pin 64 is moved out of the engagement with the notches 52 of the locking bar 54. If the release button 60 is released the force of the spring 68 moves the hinge mechanism 66 back to the locked position in which the pin 64 engages one of the notches 52 of the locking bar 54. FIG. 8 shows the push rod 62, the hinge mechanism 66, the lever 67 and the locking pin 64 in more detail.

The structural design and support of the steering column 30 allows the steering means 20 to withstand an application of a force of up to 1000 Newton because the sliding mechanism of the steering column 30 with linear ball bearings 32 and the guide rail 34 is particularly solid.

By the concept of the steering means 20, it is assured that the operator can easily and quickly adjust the steering column 30 by pushing the release button 60 and simultaneously adjusting the steering column in one movement along the adjustment axis 21. This allows for a fast retraction of the steering means 20 and thus for a facilitated getting on and getting off the fork lift truck 10. This allows the operator to retract the steering means 20 every time he gets off the fork lift truck 10 and to extend the steering means 20 every time he gets on the fork lift truck 10 again. Thus the steering means 20 is not only easily adjustable to the operator, it is also easily retractable to provide more space in the driver's cabin for getting on and off the forklift truck.

LIST OF REFERENCE SIGNS 10 fork lift truck
12 horizontal axis
20 steering means
21 adjustment axis
30 steering column
32 linear ball bearing
34 guide rail
36 retraction direction
38 extension direction
40 steering wheel
42 electrical rotary encoder
50 locking means
52 notch
54 locking bar
60 release button
62 push rod
63 push direction
64 pin
65 pin release direction
66 hinge mechanism
67 lever
68 spring

The invention claimed is:

1. A fork lift truck comprising a steering mechanism, the steering mechanism comprising:
a steering column that is adjustable by extending and retracting along an adjustment axis, the steering column comprising a steering device portion and a grip portion;
a steering device that is arranged on the steering device portion of the steering column;
a locking device configured to lock the steering column at one or more positions along the adjustment axis of the steering column and further configured to release the steering column for adjustment;
a release button located on the grip portion of the steering column and operatively connected to the locking device and configured to control the locking device; wherein
the release button is configured to release the locking device in response to the release button being actuated by an operator's hand grasping the grip portion of the steering column, thereby enabling adjustment of the steering column; and
the steering column is configured such that adjustment of the steering column is performed simultaneously by the same hand that grasps the grip portion of the steering column.

2. A fork lift truck according to claim 1, wherein said release button is configured to be pushed essentially parallel to the adjustment axis.

3. A fork lift truck according to claim 2, wherein the release button is configured to be pushed in the retraction direction of the steering column.

4. A fork lift truck according to claim 2, wherein the release button is configured to be pushed in the extension direction of the steering column.

5. A fork lift truck according to claim 1, wherein the steering column is adjustable in different latch positions.

6. A fork lift truck according to claim 1, wherein when not actuated, the release button is configured to control the locking device such that the steering column is held in position.

7. A fork lift truck according to claim 1, wherein the steering device comprises an electrical rotary encoder.

8. A fork lift truck according to claim 1, wherein the release button is spring-loaded.

9. A fork lift truck according to claim 1, wherein the steering column comprises a linear ball bearing mount.

10. A fork lift truck according to claim 1, wherein the steering column is adapted to withstand an application of a force of up to 1000 N.

11. A fork lift truck according to claim 1, wherein the release button is arranged such that it is adapted to be actuated by the palm of the hand of an operator.

12. A fork lift truck according to claim 1, wherein the release button is arranged such that it is adapted to be actuated by one or more fingers of an operator.

13. A fork lift truck according to claim 1, wherein the steering column is inclined relative to a horizontal axis of the fork lift truck by an angle of 1° to 20° relative to the horizontal axis of the fork lift truck.

14. A fork lift truck according to claim 13, wherein the steering column is inclined relative to the horizontal axis of the fork lift truck by an angle of 10° relative to the horizontal axis of the fork lift truck.

15. A fork lift truck according to claim 1, wherein the release button is mechanically connected to the locking device.

16. A fork lift truck according to claim 9, further comprising a guide rail that linearly supports the steering column, wherein the guide rail is rigidly mounted to the frame of the fork lift truck.

17. A steering mechanism comprising:
a steering column that is adjustable by extending and retracting along an adjustment axis, the steering column comprising a steering device portion and a grip portion;
a steering device that is arranged on the steering device portion of the steering column;
a locking device configured to lock the steering column at one or more positions along the adjustment axis of the steering column and further configured to release the steering column for adjustment;
a release button located on the grip portion of the steering column and operatively connected to the locking device and configured to control the locking device; wherein
the release button is configured to release the locking device in response to the release button being actuated by an operator's hand while grasping the grip portion of the steering column, thereby enabling adjustment of the steering column; and
the steering column is configured such that adjustment of the steering column is performed simultaneously by the same hand that grasps the grip portion of the steering column.

18. A steering mechanism according to claim 17, wherein the steering column further comprises
a guide rail that linearly supports the steering column, wherein the guide rail is configured for rigidly mounting to a frame of a vehicle; and
a linear ball bearing mount engaging the guide rail.

19. A steering mechanism comprising:
a steering column that is adjustable by extending and retracting along an adjustment axis;
a steering device that is arranged on the steering column;

a locking device configured to lock the steering column at a one or more positions along the adjustment axis of the steering column and further configured to release the steering column for adjustment;

a guide rail that linearly supports the steering column, wherein the guide rail is configured for rigidly mounting to a frame of a vehicle;

a release button that is operatively connected to the locking device and is configured to control the locking device; wherein the release button is configured to release the locking device in response to the release button being actuated by an operator's hand, thereby enabling adjustment of the steering column; and the steering column is configured such that adjustment of the steering column is performed simultaneously by the same hand that actuates the release button.

20. A steering mechanism according to claim 19, wherein the steering column further comprises a linear ball bearing mount engaging the guide rail.

\* \* \* \* \*